US009280667B1

(12) United States Patent
Keanini et al.

(10) Patent No.: US 9,280,667 B1
(45) Date of Patent: Mar. 8, 2016

(54) PERSISTENT HOST DETERMINATION

(75) Inventors: Timothy D. Keanini, Novato, CA (US); Andrew Molitor, San Francisco, CA (US); John-Mark Gurney, Oakland, CA (US); Jeremy Cooper, Petaluma, CA (US); Brian Buchanan, San Leandro, CA (US)

(73) Assignee: Tripwire, Inc., Portland, OR (US)

( * ) Notice: Subject to any disclaimer, the term of this patent is extended or adjusted under 35 U.S.C. 154(b) by 1103 days.

(21) Appl. No.: 11/033,414

(22) Filed: Jan. 10, 2005

(51) Int. Cl.
*G06F 12/14* (2006.01)
*G06F 21/57* (2013.01)
*H04L 29/06* (2006.01)

(52) U.S. Cl.
CPC ............ *G06F 21/577* (2013.01); *H04L 63/1433* (2013.01)

(58) Field of Classification Search
CPC ..................... G06F 21/577; H04L 63/1433
USPC .......................................................... 726/25
See application file for complete search history.

(56) References Cited

U.S. PATENT DOCUMENTS

| 5,136,523 | A | 8/1992 | Landers |
| 5,278,901 | A | 1/1994 | Shieh et al. |
| 5,388,211 | A | 2/1995 | Hornbuckle |
| 5,440,723 | A | 8/1995 | Arnold et al. |
| 5,557,742 | A | 9/1996 | Smaha et al. |
| 5,699,403 | A | 12/1997 | Ronnen |
| 5,796,942 | A | 8/1998 | Esbensen |
| 5,798,706 | A | 8/1998 | Kraemer et al. |
| 5,802,320 | A | 9/1998 | Baehr et al. |
| 5,850,516 | A | 12/1998 | Schneier |
| 5,892,903 | A | 4/1999 | Klaus |
| 5,919,257 | A | 7/1999 | Trostle |
| 5,923,646 | A | 7/1999 | Mandhyan |
| 5,925,126 | A | 7/1999 | Hsieh |
| 5,931,946 | A | 8/1999 | Terada et al. |
| 5,958,015 | A | 9/1999 | Dascalu |

(Continued)

FOREIGN PATENT DOCUMENTS

| WO | WO 01/31420 A2 | 5/2001 |
| WO | WO 01/84270 A2 | 11/2001 |

(Continued)

OTHER PUBLICATIONS

Abstract, W. Erhard, et al., "Network Traffic Analysis and Security Monitoring With UniMon", Proceeding of the IEEE Conference on High Performance Switching and Routing, 2000, ATM 2000, pp. 439-446 (Jun. 2000).

(Continued)

*Primary Examiner* — Aravind Moorthy
(74) *Attorney, Agent, or Firm* — Klarquist Sparkman, LLP

(57) ABSTRACT

A system comprises a security manager to scan a network for host instances representing hosts on the network at that time, and record characteristics of the host instances in a host record. The security manager subsequently scans the network for host instances in order to identify persistent hosts. A host profiling module takes snapshots of the network to generate host instances based on characteristics such as an IP address, a NetBIOS name, a DNS name, a MAC address. A host matching module correlates host instances from different snapshots using weighted rules (predetermined or customized) to discriminate between multiple potential matching host instances. Also, security logic makes security decisions based on data including persistent host information.

34 Claims, 5 Drawing Sheets

(56) References Cited

U.S. PATENT DOCUMENTS

| | | | |
|---|---|---|---|
| 5,961,644 A | 10/1999 | Kurtzberg et al. | |
| 5,991,881 A | 11/1999 | Conklin et al. | |
| 6,006,328 A | 12/1999 | Drake | |
| 6,088,804 A | 7/2000 | Hill et al. | |
| 6,101,606 A | 8/2000 | Diersch et al. | |
| 6,185,689 B1 | 2/2001 | Todd, Sr. et al. | |
| 6,199,181 B1 | 3/2001 | Rechef et al. | |
| 6,263,444 B1 | 7/2001 | Fujita | |
| 6,269,447 B1 | 7/2001 | Maloney et al. | |
| 6,279,113 B1 | 8/2001 | Vaidya | |
| 6,282,546 B1 | 8/2001 | Gleichauf et al. | |
| 6,298,445 B1 | 10/2001 | Shostack et al. | |
| 6,301,668 B1 | 10/2001 | Gleichauf et al. | |
| 6,321,338 B1 | 11/2001 | Porras et al. | |
| 6,324,656 B1 | 11/2001 | Gleichauf et al. | |
| 6,330,562 B1 | 12/2001 | Boden et al. | |
| 6,343,362 B1 | 1/2002 | Ptacek et al. | |
| 6,347,376 B1 | 2/2002 | Attwood et al. | |
| 6,359,557 B2 | 3/2002 | Bilder | |
| 6,363,489 B1 | 3/2002 | Comay et al. | |
| 6,370,648 B1 | 4/2002 | Diep | |
| 6,408,391 B1 | 6/2002 | Huff et al. | |
| 6,415,321 B1 | 7/2002 | Gleichauf et al. | |
| 6,470,384 B1 | 10/2002 | O'Brien et al. | |
| 6,473,800 B1 | 10/2002 | Jerger et al. | |
| 6,477,651 B1 | 11/2002 | Teal | |
| 6,484,203 B1 | 11/2002 | Porras et al. | |
| 6,484,315 B1 | 11/2002 | Ziese | |
| 6,490,626 B1 | 12/2002 | Edwards et al. | |
| 6,502,135 B1 | 12/2002 | Munger et al. | |
| 6,574,737 B1 | 6/2003 | Kingsford et al. | |
| 6,578,147 B1 | 6/2003 | Shanklin et al. | |
| 6,584,569 B2 | 6/2003 | Reshef et al. | |
| 6,609,205 B1 | 8/2003 | Bernhard et al. | |
| 6,687,833 B1 | 2/2004 | Osborne et al. | |
| 6,708,212 B2 | 3/2004 | Porras et al. | |
| 6,711,127 B1 | 3/2004 | Gorman et al. | |
| 6,735,169 B1 | 5/2004 | Albert et al. | |
| 6,735,702 B1 | 5/2004 | Yavatkar et al. | |
| 6,771,597 B2 | 8/2004 | Makansi et al. | |
| 6,775,657 B1 | 8/2004 | Baker | |
| 2002/0133721 A1 | 9/2002 | Adjaoute | |
| 2004/0049586 A1* | 3/2004 | Ocepek et al. | 709/229 |
| 2005/0038827 A1* | 2/2005 | Hooks | 707/200 |
| 2005/0050357 A1* | 3/2005 | Jeng et al. | 713/201 |
| 2005/0086473 A1* | 4/2005 | Barkley et al. | 713/170 |
| 2005/0188419 A1* | 8/2005 | Dadhia et al. | 726/1 |
| 2005/0216957 A1* | 9/2005 | Banzhof et al. | 726/25 |
| 2005/0289219 A1* | 12/2005 | Nazzal | 709/203 |
| 2006/0064619 A1* | 3/2006 | Wen et al. | 714/734 |

FOREIGN PATENT DOCUMENTS

| | | |
|---|---|---|
| WO | WO 02/19661 A2 | 3/2002 |
| WO | WO 02/45380 A2 | 6/2002 |
| WO | WO 03/100617 A1 | 12/2003 |

OTHER PUBLICATIONS

Abstract, Dept. of Comput. Sci., California Univ., Davis, CA, USA, "A Methodology for Testing Intrusion Detection Systems", IEEE Transactions on Software Engineering, vol. 22, Issue 10, pp. 719-729 (Oct. 1996).

Abstract, Mounji A. Le Charlier, et al., "Distributed Audit Trail Analysis", Proceeding of the Symposium on Network and Distributed System Security, 1995, pp. 102-112 (Feb. 16-17, 1995).

Abstract, L.T. Heberlein, et al., "A Network Security Monitor" Proceeding of the 990 IEEE Computer Society Symposium on Research in Security and Privacy, pp. 296-304, (May 7-9, 1990).

Abstract, Xinzhou Quin et al., "Integrating Intrusion Detection and Network Management", Network Operation and Managemer Symposium, 2002. NAOMS 2002. 2002 IEEE/IFIP, pp. 329-344 (Apr. 15-19, 2002).

Abstract, D.G. Schwartz et al., "A Case-Based Approach to Network Intrusion Detection", Proceeding of the 5th International Conference on Information Fusion, 2002. vol. 2 pp. 1084-1089 (Jul. 8-11, 2002).

Abstract, "Open Source Security: Opportunity or Oxymoron?" Computer, vol. 35, Issue 3, pp. 18-21 (Mar. 2002).

Abstract, Liu Dihua, et al. "Data Mining for Intrusion Detection", Proceedings ICII 2001—Beijing 2001 International Conference on Info-Tech and Info-Net, 2001, vol. 5, pp. 7-12, (Oct. 29-Nov. 2001).

Abstract, Kai Hwang & M. Gangadharan, "Micro-Firewalls for Dynamic Network Security With Distributed Intrusion Detection", NCA 2001 IEEE International Symposium on Network Computing and Applications, 2001. pp. 68-79, (Oct. 8-10, 2001).

Abstract, Wenke Lee Stolfo, et al., "Real Time Data Mining-Based Intrusion Detection", Proceedings DARPA Information Survivability Conference & Exposition II, 2001, DISCEX '01. vol. 1, pp. 89-100 (Jun. 12-14, 2001).

Abstract, J. Burns, et al. Automatic Management of Network Security Policy, Proceedings DARPA Information Survivablity Conference & Exposition II 2001, DISCEX '01. vol. 2, pp. 12-26, (Jun. 12-14, 2001).

Abstract, Heberlein, et al. "A Network Security Monitor", 1990, Proceedings Research in Security & Privacy 1990 IEEE Computer Society Symposium on, pp. 296-304, (May 7-9, 1990).

Anderson, Teresa, "Hunting for Holes," Security Management, Arlington, Apr. 1996, 2 pages.

Anonymous, Microsoft Computer Dictionary, 2002, Microsoft Press, Fifth Edition, p. 291.

Bace, Rebecca, An Introduction to Intrusion Detection & Assessment, ICSA, Inc., 1999, pp. 1-38.

Breyfogle, Stacey, "Don't Stop at Your Servers," Software Magazine, Englewood, Jan. 1998, pp. 1-3.

Fyodor, Remote OS Detection Via TCP/IP Stack FingerPrinting, Oct. 18, 1998, pp. 1-10.

Johnson, Johna Till, "Simulated Attack for Real Network Security," Data Communications, Nov. 2, 1995, pp. 31-32.

"Microsoft Computer Dictionary Fifth Edition," 2002, 6 pages.

Phipatanasuphorn et al., Vulnerability of Sensor Networks to Unauthorized Traversal and Monitoring, IEEE Transactions On Computers, Mar. 2004, pp. 364-369.

Ristenbatt, Martin P., Methodology for Network Communication Vulnerability Analysis, IEEE, 1988, pp. 493-499.

Skaggs, B., et al., Network Vulnerability Analysis, IEEE, 2002, pp. 493-495.

Thatcher, Michelle, Keeping Your Technology Secure, Technology & Learning, Apr. 2002, pp. 38, 40, 42 and 44.

Yurcik, William, Controlling Intrusion Detection Systems by Generating False Positives: Squealing Proof-of-Concept, Proceedings of the 27th Annual IEEE Conference on Local Computer Networks, 2002, pp. 134-135.

* cited by examiner

PERSISTENT HOST DETERMINATION

CROSS-REFERENCES TO RELATED APPLICATIONS

This application is related to U.S. patent application Ser. No. 10/456,837, filed Jun. 6, 2003, which is a continuation-in-part of: U.S. patent application Ser. No. 09/757,963, filed Jan. 10, 2001, U.S. patent application Ser. No. 09/757,872, filed Jan. 10, 2001, and U.S. patent application Ser. No. 09/648,211, filed Aug. 25, 2000. The related applications are incorporated herein by reference.

BACKGROUND OF THE INVENTION

1. Field of the Invention

This invention relates generally to computer networks and, more specifically, to identifying a host through changes in the configuration of a dynamic network.

2. Description of the Related Art

Network security systems need an accurate snapshot of a network in order to provide optimal protection. Some devices on the network are configured to use static Internet Protocol (IP) addresses, allowing the network security system to easily track those devices. For example, a record or log of host characteristics, vulnerabilities, past attacks, and the like can be consistently associated with a device having a given address.

However, some networks and devices are configured to use dynamic IP addresses, which can cause the device to be disassociate from its record or log. Using techniques such as Dynamic Host Configuration Protocol (DHCP), a DHCP server can dynamically assign IP addresses on an as-needed basis from a pool. As a result, fewer IP addresses are needed. On the other hand, the network security system is unable to leverage off previously gathered information concerning a device that is not new to the network, but has merely been assigned a different IP address. Reassignment of IP addresses is not uncommon, occurring as a result of, for example, rebooting either the network security system or a device, physically unplugging a device from the network, manual configuration, and the like.

Problematically, the network security system performance is degraded in a dynamic network as it no longer has an accurate snapshot of the network. For example, if the device record contains a list of vulnerabilities present on the device, but the network security system is unable to retrieve this information because the address of the device has changed, the device may not be protected against those vulnerabilities. Nor is a network administrator able to make informed security decisions.

Additionally, self-identification of devices is unreliable and can further degrade performance. One way for a device to self-identify is through a service banner. However, hackers can easily compromise and edit service banners to misidentify the device. Furthermore, service banners often contain insufficient information concerning, for example, application version numbers and patch levels.

Therefore, what is needed is a robust network security system capable of persistently identifying a device through changes on a dynamic network. Furthermore, a network security system should be capable of providing the same level of security to a dynamic network as it does to a static network.

BRIEF SUMMARY OF THE INVENTION

The present invention meets these needs with systems, methods, and computer program products for persistent host recognition in a network application such as a security system. In one embodiment, the system comprises a security manager to scan a network for host instances representing hosts on the network at that time, and record characteristics of the host instances in a host record. In another embodiment, the security manager scans the network for host instances in order to identify persistent hosts based on the host records. Advantageously, this technique allows a security system to provide the same level of security to a dynamic network as to a static network.

In one embodiment, the security manager comprises a host profiling module. The host profiling module takes snapshots of the network to generate host instances based on characteristics such as IP addresses, NetBIOS names, DNS names, MAC addresses, and the like. Host instances can include persistent (or previously existing) hosts and/or new hosts. Another embodiment of the host profiling module determines additional characteristics such as an operating system running on the host including the version and/or patch level, and network service applications running on the host including version and/or patch levels. The host profiling module can profile hosts by interrogating the host with data packets and analyzing responses to the data packets for inferential information. Thus, the system is able to reliably gather information about a host for matching.

In another embodiment, the security manager comprises a host matching module. The host matching module correlates host instances from different snapshots. The host matching module can use weighted rules (predetermined or customized) to discriminate between multiple potential matching host instances. For example, a matching NetBIOS name might have significantly more influence than a matching IP address, especially when the two characteristics are inconsistent. When the network reconfigures hosts, for example through dynamically reassigning IP addresses, the security manager is able to correlate a host to its existing host record. The host record can contain, for example, a security policy, vulnerability information, unique host characteristics, and the like.

In yet another embodiment, the security manager comprises security logic. The security logic makes security decisions based on data including persistent host information. For example, a network administrator can view charts that summarize host security configurations of the network. In another example, an intrusion detection system can monitor network traffic based on vulnerability information. In still another example, the security logic can manage a host's ability to access the network, i.e., configure network switches to block or allow packet exchanges with outside networks.

The features and advantages described in this summary and the following detailed description are not all-inclusive, and particularly, many additional features and advantages will be apparent to one of ordinary skill in the art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF PREFERRED EMBODIMENTS

Systems, methods, and computer program products for persistent host recognition in a network application such as a security system are disclosed. Some embodiments of the system are set forth in FIGS. 1-2, and some embodiments of the method operating therein are set forth in FIGS. 3-5. The accompanying description is for the purpose of providing a thorough explanation with numerous specific details. Of course, the field of computer networking is such that many different variations of the illustrated and described features of the invention are possible. Those skilled in the art will thus undoubtedly appreciate that the invention can be practiced without some specific details described below, and indeed will see that many other variations and embodiments of the invention can be practiced while still satisfying its teachings and spirit. Accordingly, the present invention should not be understood as being limited to the specific implementations described below, but only by the claims that follow.

The processes, features, or functions of the present invention can be implemented by program instructions that execute in an appropriate computing device. The program instructions can be distributed on a computer readable medium, within a semiconductor device, or through a public network. Program instructions can be in any appropriate form, such as source code, object code, or scripts.

Figure 1:
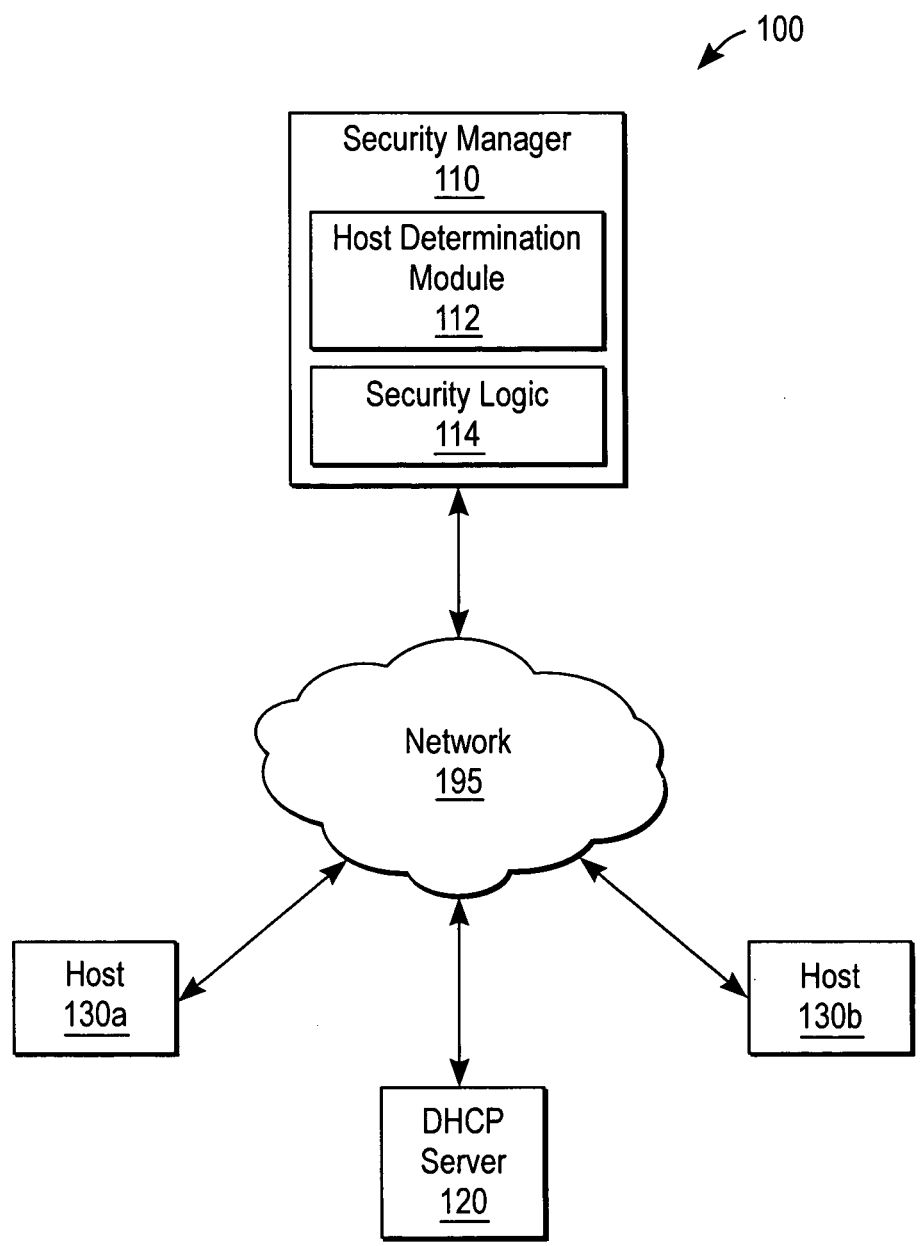
FIG. 1 is a block diagram illustrating a network security system for persistent host determination according to one embodiment of the present invention.

FIG. 1 is a block diagram illustrating a network security system 100 for persistent host determination according to one embodiment of the present invention. The system 100 comprises a security manager 110 and a DHCP server 120, both coupled to hosts 130a-b (collectively referred to hereafter as 130) through a network 195. Although the system is described herein as operating in a data network communicating through the IP protocol, one or ordinary skill in the art will recognize that the system 100 can also operate in networks using other protocols and/or technologies.

The security manager 110 provides network security functions to the hosts 130 such as vulnerability analysis, intrusion detection, and the like. The security manager 110 further comprises a host determination module 112 and a security logic module 114. Generally, the host determination module 112 uses host characteristics to match host instances from snapshots of the network with records of persistent hosts. The security logic 114 can access information from the host determination module 114 to make security decisions. For example, the security logic 114 can check network traffic for vulnerabilities of a particular persistent host, based on the persistent host's current network address. In another example, a network administrator can view charts that summarize host security configurations of the network. Of course the described 'modules' are only exemplary groupings of functionality. Consequently, alternate groupings of functionality within the scope of the present invention are contemplated, such as a security manager 110 distributed around the network 195, or having multiple instances executing on hosts 130.

Figure 2:
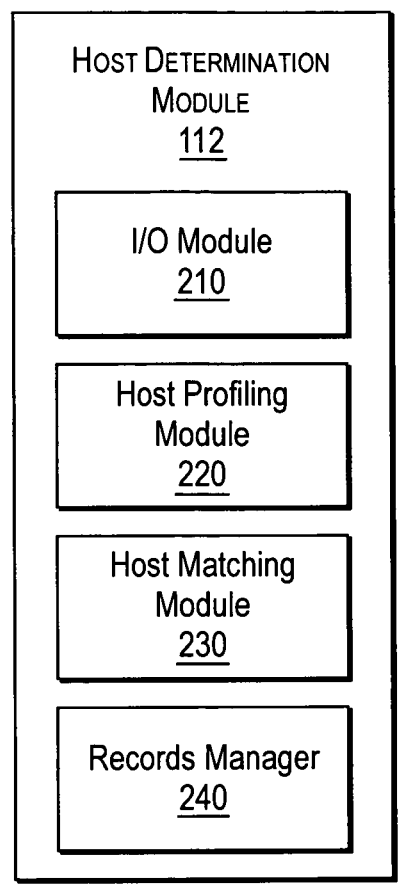
FIG. 2 is a block diagram illustrating of a host determination module according to one embodiment of the present invention.

FIG. 2 is a more detailed block diagram of the host determination module 112 according to one embodiment of the present invention. The host determination module 112 comprises an I/O module 210 to discover host instances on the network by, for example, polling network addresses and/or ports, receiving self-identification messages from hosts, and the like.

In one embodiment, the host determination module 112 comprises a host profiling module 220 to determine characteristics of the discovered hosts 130. The host profiling module 112 receives host characteristics such as IP address, NetBIOS names, DNS names, MAC addresses, and the like. Another embodiment of the host profiling module 112 interrogates the hosts 130 to determine different and/or additional characteristics such as operating systems running on the hosts including the versions and/or patch levels, and applications running on the hosts including versions and/or patch levels. The records manager 240 stores host records identifying the hosts and containing the host characteristics. A host record can also contain, for example, a security policy, vulnerability information, unique host characteristics, and the like.

In one embodiment, the host determination module 112 comprises a host matching module 230. The host matching module 230 correlates a host 130 currently being scanned to a record of a previously scanned host 130, if possible. The host matching module 230 can use weighted rules to discriminate between multiple potential matches. When the network experiences change, for example through dynamically assigned IP addresses, the system 100 is able to correlate a host 130 to its existing host record stored in the records manager 240. If the host 130 does not correlate with an existing host record, one embodiment of the host determination module 230 creates a new host record.

Referring again to FIG. 1, the hosts 130 communicate with each other and with other hosts on outside networks. A host 130 may be a computer, computer peripheral, telephone, or any other device able to connect to the network. The hosts 130 have characteristics such as a network address, open ports, and executing software such as an operating system and applications. The operating systems and applications can be an original release, or also comprise an updated version or patch. These updates can change the actions of the security logic 114 such as which vulnerabilities to associate with the host 130.

Still referring to FIG. 1, the DHCP server 120 dynamically assigns IP addresses to hosts 130 that connect to the network on an as-needed basis. Some hosts 130 can be connected to the network and have a LAN sub-network address, but do not need an IP address because these hosts 130 are not communicating outside of a private network. At the time that one of the hosts 130 desires outside communication, it can contact the DHCP server 120 for an IP address for this purpose. When outside communication has concluded, either deliberately by relinquishing the IP address, or through a fault such as a host crash, the IP address can be used by a different host 130. The DHCP server 120 may be a computer, server blade, or any other device able to manager network addresses. In other embodiments, the system 100 comprises another component that dynamically configures the network 195, such as an address pool manager, a resource pool manager, a hardware pool manager, and the like.

Figure 3:
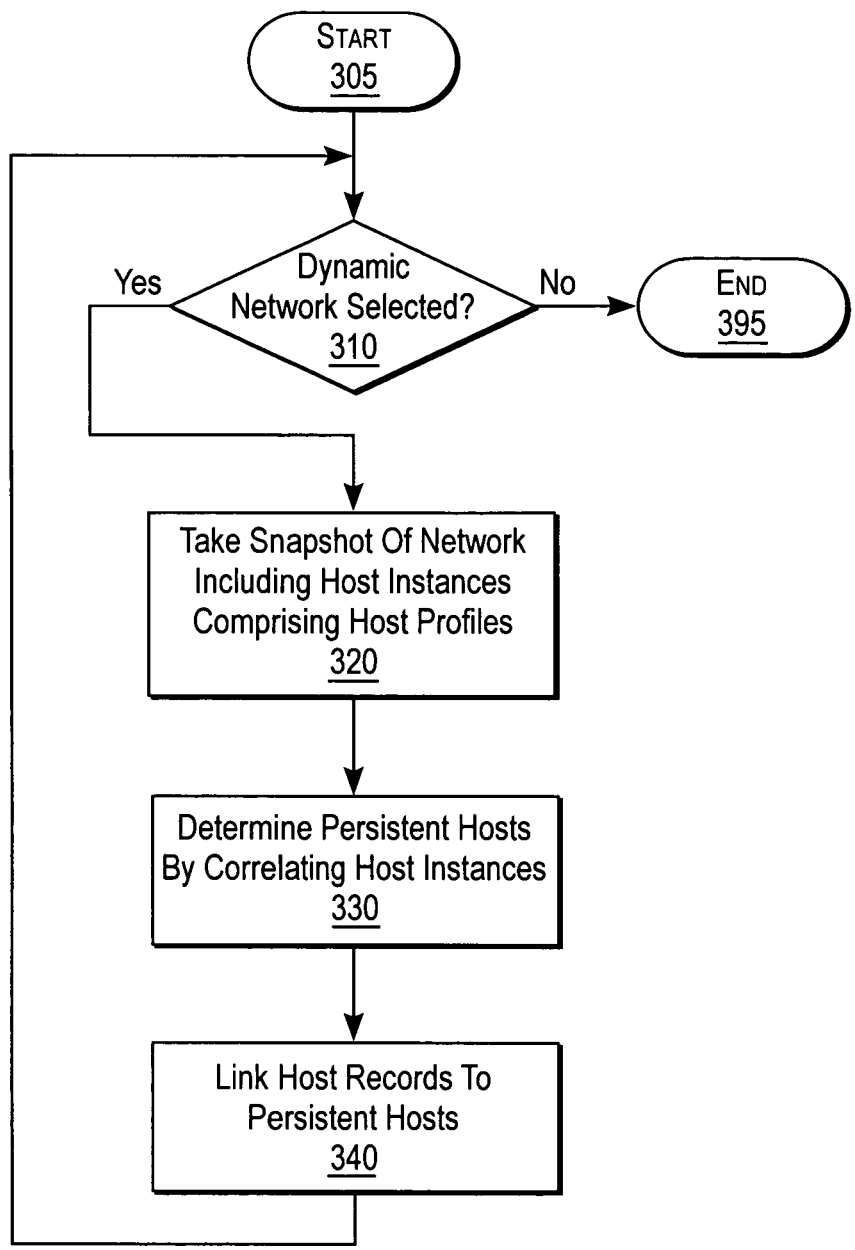
FIG. 3 is a flow chart illustrating a method for persistent host determination according to one embodiment of the present invention.

FIG. 3 is a flow chart illustrating a method 300 for persistent host determination according to one embodiment of the present invention. Host determination continues while the network 195 is configured as a dynamic network 310. The host profiling module 220 takes 320 a snapshot of the network 195 to generate host instances. In one embodiment, the profiling module 220 detects host characteristics such as IP addresses, NetBIOS names, DNS names, MAC addresses, running applications (which can include the versions and/or patch levels of the applications), and operating systems (which can also include the versions and/or patch levels) in the snapshots. The snapshots can be gathered automatically by exchanging data with the hosts 130 and/or from information manually provided by a network administrator or other entity.

In one embodiment, the profiling module 220 interrogates the hosts 130 to inferentially determine the operating systems and/or network service applications running on the hosts. This network-based profiling makes independent determinations rather than relying on the host 130 to self-identify through a banner or other often unreliable methods. The profiling module 220 can examine OSI (Open Systems Interconnection) layer 5, layer 6 and/or layer 7 aspects of the host 130 to determine running applications and other characteristics of the host 130. For example, telnet applications typically run on port 23. Responsive to port 23 being open, the profiling module 220 attempts to open a telnet session on the port and sends general or application-specific command line instructions to the telnet application. The profiling module 130 examines responses to the instructions that are unique to a type of telnet application. The profiling module 130 can further examine the telnet application for responses that are unique to a version and/or patch level of that particular application.

In one embodiment, the profiling module 220 examines layer 3 and/or layer 4 aspects of the host 130 for responses to anomalous data packets to determine an operating system and other characteristics of the host 130. Anomalous data packets are nonconforming relative to RFC (Request For Comment) protocols promulgated by the Internet Engineering Task Force. The host 130 typically responds to conforming data packets with conforming responses. By contrast, the host 130 may have unique responses to anomalous data packets since such responses are not standardized. The profiling module 130 examines responses to determine the operating system, and its version and/or patch level. The inferential process is described in further detail in commonly-owned U.S. patent application Ser. No. 10/456,837.

Figure 4:
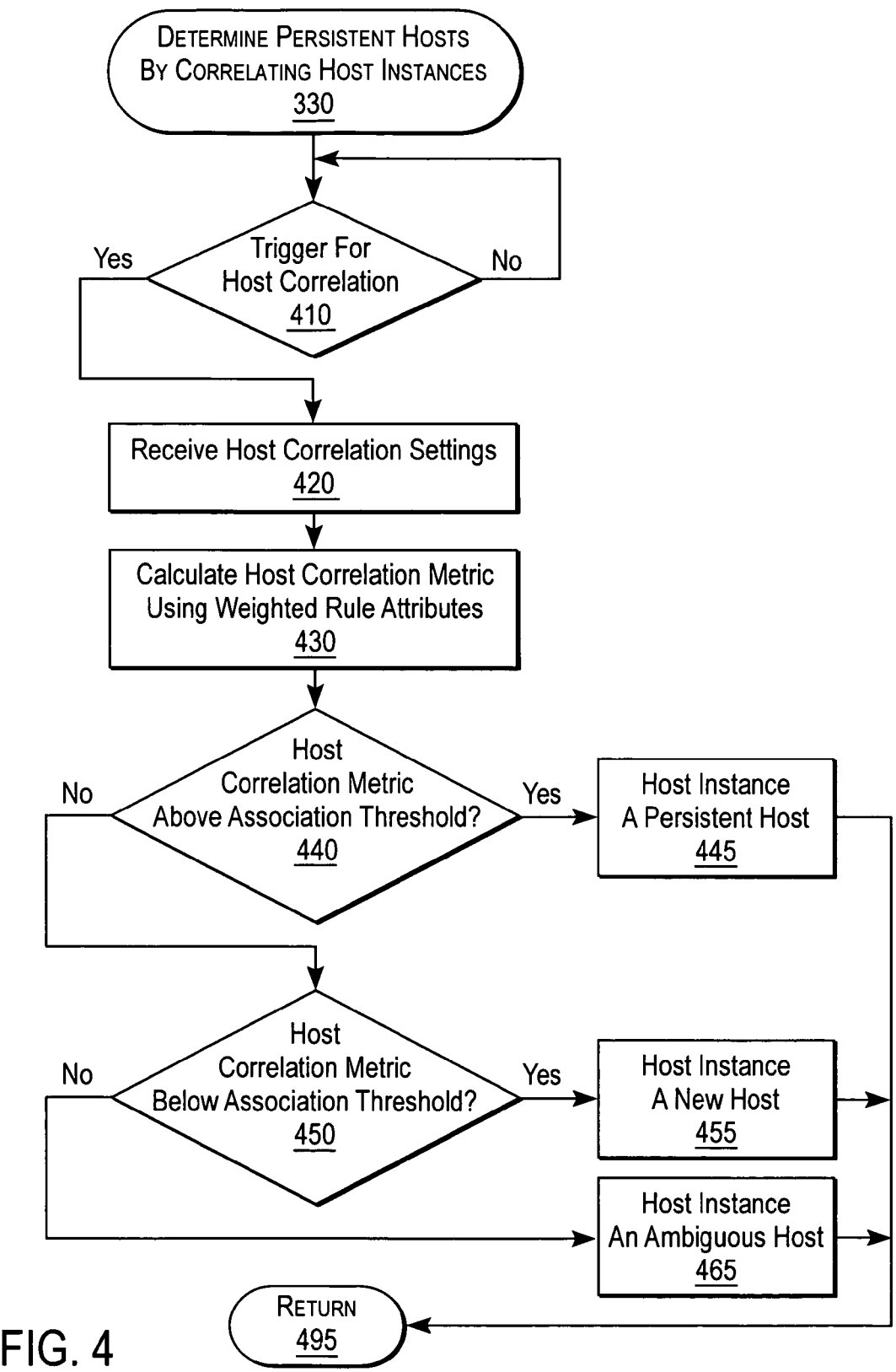
FIG. 4 is a flow chart illustrating a method for determining persistent hosts by correlating host instances according to one embodiment of the present invention.

The host matching module 230 determines 330 persistent hosts by correlating host instances detected in the snapshot with host records. A flow chart in FIG. 4 illustrates an exemplary method 330 of determining persistent hosts according to one embodiment of the present invention. A new snapshot by the host profiling module 220 triggers 410 this process. For example, the host profiling module 220 can populate a new database row of host instances for the network 195. The host matching module 230 receives 420 host correlation settings that specify how to correlate host instances with host records. These settings can be specific to the network 195. Exemplary host correlation settings include an association threshold, a creation threshold, a set of weighted rules, and the like. Note that a host 130 can also be part of separate networks having different host correlation settings. As a result, the host 130 may be determined to be a persistent host in a first network, and determined to be a new host in a second network.

To determine which new host instances match previous host instances as indicated by the host records, the host matching module 230 calculates 430 a host correlation metric. In one embodiment, this calculation uses weighted rules so that reliable characteristics have a greater influence. A sum of the weighted rules can operate as a fuzzy match function to categorize a new host instance into a state such as a positively established host (or persistent host), a negatively established host (or new host), or an ambiguously established host.

More specifically, one embodiment of the host matching module 230 categorizes the sum of weighted rules based on thresholds. If the sum exceeds an association threshold 440, the new host instance is considered a persistent host 445 and can be associated with the record of its previous host instance. If the sum falls fellow a creation threshold 450, the new host instance is considered a new host 455 and a new host record is created in one embodiment. Otherwise, the new host instance is considered an ambiguous host 465. In one embodiment, ambiguous hosts can be retested, for example, based on a subsequent snapshot against subsequent host instances. Also, ambiguous hosts can be retested responsive to a change in rule weightings. The host matching module 230 can use generalized rule weights or customized rule weights.

Figure 5:
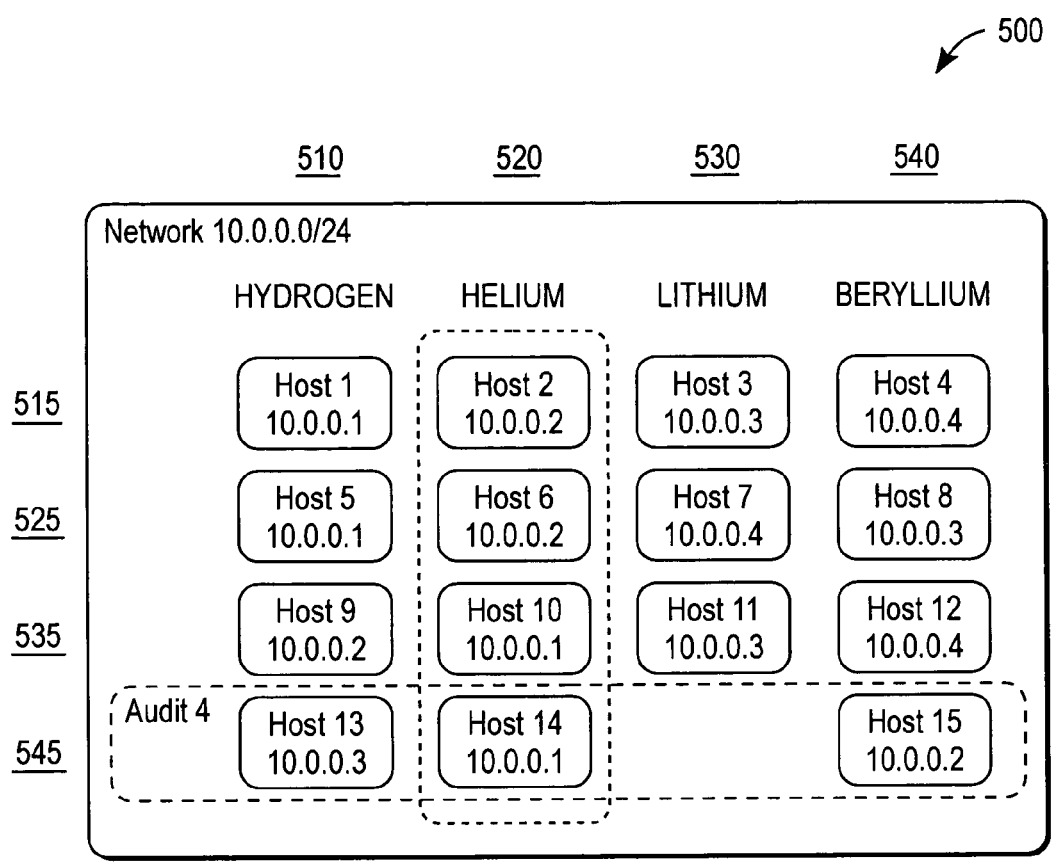
FIG. 5 illustrates exemplary results from host matching in a summary view according to one embodiment of the present invention.

FIG. 5 illustrates exemplary results from host matching in a summary view 500 according to one embodiment of the present invention. In FIG. 5, the host matching module 230 organizes a database of host instances 1-15 from network 10.0.0.0/24 in a tabular format that can be displayed through a user interface to the network administrator. Each row 515, 525, 535, 545 represents a separate snapshot (or audit), and each column 510, 520, 530, 540 represents a persistent host.

According to the examplary summary view 500, the persistent host having NetBIOS name HYDROGEN was located at sub-network address 10.0.0.1 for the first two snapshots 515, 525, but changed to sub-network address 10.0.0.2 before the third snapshot 535, and again changed to sub-network address 10.0.0.3 before the fourth snapshot 545. However, during each snapshot, the persistent host maintained its NetBIOS name. Similarly, persistent hosts HELIUM, LITHIUM, and BERYLLIUM also maintained consistent NetBIOS names. In this configuration, the network administrator can more heavily weight NetBIOS matching rules since they are a reliable aspect of the 10.0.0.0/24 network. In another embodiment, the NetBIOS name is not consistent. For example, HYDROGEN can be assigned its NetBIOS name just prior to the fourth snapshot 545, causing the host matching module 230 to rely on other characteristics such as applications identified on the host 130.

Referring again to FIG. 3, the host matching module 230 links 340 host records from the records manager 240 to persistent hosts detected in the snapshot. As a result, in the security application example, the security manager 110 can use the security logic 114 to make security decisions based on the current snapshot of persistent hosts. For example, a network administrator can view charts that summarize host security configurations of the network. In another example, an intrusion detection system can monitor network traffic based on vulnerability information. In still another example, the security logic can manage a host's ability to access the network, i.e., configure network switches to block or allow packet exchanges with outside networks.

We claim:

1. A method for identifying persistent hosts in a dynamically configured network, comprising:

establishing a plurality of records, each record stored on a storage medium and describing one or more characteristics of a persistent host on the network and one or more detected vulnerabilities of the persistent host, wherein the persistent host corresponds to a previously observed host instance on the network;

receiving a snapshot of the network having at least one currently existing host instance for an unknown host on the network, the unknown host having a dynamically assigned IP address assigned on an as-needed basis from a Dynamic Host Configuration Protocol (DHCP) server;

matching one or more characteristics of the currently existing host instance to the characteristics of a persistent host described in at least one of the records;

identifying the unknown host associated with the currently existing host instance to be the persistent host described by the matching record;

retrieving from the matching record one or more of the detected vulnerabilities of the persistent host corresponding to the currently existing host instances; and applying one or more security decisions for the currently existing host instance based on the retrieved detected vulnerabilities of the persistent host corresponding to the currently existing host instance.

2. The method of claim 1, wherein the host instance describes at least one host characteristic from a group consisting of: an IP address, a NetBIOS name, a DNS name, and a MAC address.

3. The method of claim 1, wherein receiving a snapshot comprises:
detecting an update to a database, the database describing the plurality of hosts on the network.

4. The method of claim 1, wherein the matching comprises:
selecting from among a plurality of correlation rules responsive to the network.

5. The method of claim 1, wherein the matching comprises:
calculating a host correlation metric representative of a probability that the host described by the host instance in the snapshot matches the persistent host described by the at least one record.

6. The method of claim 1, wherein the matching comprises:
calculating a host correlation metric using weighted rules, each weighted rule specifying a potentially-matching attribute of the record and the host instance and a weight defining an influence of the rule.

7. The method of claim 1, further comprising:
categorizing the host instance as a new host on the network.

8. The method of claim 7, further comprising:
creating a host record describing the new host as a persistent host.

9. The method of claim 1, wherein the establishing comprises:
establishing vulnerability information in the record, the vulnerability information describing vulnerabilities of the persistent host to network-based attacks.

10. The method of claim 1, wherein the one or more characteristics of a persistent host on the network include application information.

11. The method of claim 1, wherein the matching is performed using weighted rules, the weighted rules including rules that favor matching NetBIOS names over matching IP addresses.

12. The method of claim 1, wherein the receiving the snapshot comprises interrogating the unknown host to inferentially determine one or more of an operating system or application running on the unknown host.

13. The method of claim 12, wherein the interrogating is performed by:
sending instructions or data packets at one or more layers of the open systems interconnection (OSI) model; and
examining responses sent by the unknown known responsive to the instructions or data packets.

14. The method of claim 12, wherein the interrogating comprises:
sending anomalous data packets to the unknown host, the anomalous data packets being nonconforming relative to a request for comment (RFC) protocol; and
determining an operating system running on the unknown host from the responses sent by the unknown host responsive to the anomalous data packets.

15. A system for identifying persistent hosts in a dynamically configured network, comprising:
a computer processor; and
a storage memory containing software modules thereon, the software modules comprising:
a records manager module for storing a plurality of records each describing one or more characteristics of a persistent host on the network and one or more detected vulnerabilities of the persistent host, wherein the persistent host corresponds to a previously observed host instance on the network;
a host profiling module for receiving a snapshot of the network having at least one currently existing host instance for an unknown host on the network, the unknown host having an IP address dynamically assigned from a Dynamic Host Configuration Protocol (DHCP) server;
a host matching module for matching one or more characteristics of the currently existing host instance to the characteristics of a persistent host described in at least one of the records and for identifying the unknown host associated with the currently existing host instance to be the persistent host described by the matching record; and
a security manager module for retrieving from the matching record one or more of the detected vulnerabilities of the persistent host corresponding to the currently existing host instance and applying the one or more security decisions for the currently existing host instance based on the retrieved detected vulnerabilities of the persistent host corresponding to the currently existing host instance.

16. The system of claim 15, wherein the host instance describes at least one host characteristic from a group consisting of: an IP address, a NetBIOS name, a DNS name, and a MAC address.

17. The system of claim 15, wherein the host profiling module is adapted to receive a snapshot responsive to an update to a database, the database describing the plurality of hosts on the network.

18. The system of claim 15, wherein the host matching module is adapted to select from among a plurality of correlation rules responsive to the network.

19. The system of claim 15, wherein the host matching module is adapted to calculate a host correlation metric representative of a probability that the host described by the host instance in the snapshot matches the persistent host described by the at least one record.

20. The system of claim 15, wherein the host matching module is adapted to calculate a host correlation metric using weighted rules, each weighted rule specifying a potentially-matching attribute of the record and the host instance and a weight defining an influence of the rule.

21. The system of claim 15, wherein the host matching module is adapted to categorize the host instance as a new host on the network.

22. The system of claim 21, wherein the records manager module is adapted to create a host record describing the new host as a persistent host.

23. The system of claim 15, wherein the records manager module is adapted to store vulnerability information in the record, the vulnerability information describing vulnerabilities of the persistent host to network-based attacks.

24. The system of claim 15, wherein the one or more characteristics of a persistent host on the network include application information.

25. A non-transitory computer program product comprising a computer-readable medium having embodied thereon computer program logic for identifying persistent hosts in a dynamically configured network, comprising:
- a records manager module for storing a plurality of records each describing one or more characteristics of a persistent host on the network and one or more detected vulnerabilities of the persistent host, wherein the persistent host corresponds to a previously observed host instance on the network;
- a host profiling module for receiving a snapshot of the network having at least one currently existing host instance for an unknown host on the network, the unknown host having a dynamically assigned IP address assigned on an as-needed basis from a Dynamic Host Configuration Protocol (DHCP) server;
- a host matching module for matching one or more characteristics of the currently existing host instance to the characteristics of a persistent host described in at least one of the records and for identifying the unknown host associated with the currently existing host instance to be the persistent host described by the matching record; and
- a security manager module for retrieving from the matching record one or more of the detected vulnerabilities of the persistent host corresponding to the currently existing host instance and applying the one or more security decisions for the currently existing host instance based on the retrieved detected vulnerabilities of the persistent host corresponding to the currently existing host instance.

26. The computer program product of claim 25, wherein the host instance describes at least one host characteristic from a group consisting of: an IP address, a NetBIOS name, a DNS name, and a MAC address.

27. The computer program product of claim 25, wherein the host profiling module is adapted to receive a snapshot responsive to an update to a database, the database describing the plurality of hosts on the network.

28. The computer program product of claim 25, wherein the host matching module is adapted to select from among a plurality of correlation rules responsive to the network.

29. The computer program product of claim 25, wherein the host matching module is adapted to calculate a host correlation metric representative of a probability that the host described by the host instance in the snapshot matches the persistent host described by the at least one record.

30. The computer program product of claim 25, wherein the host matching module is adapted to calculate a host correlation metric using weighted rules, each weighted rule specifying a potentially-matching attribute of the record and the host instance and a weight defining an influence of the rule.

31. The computer program product of claim 25, wherein the host matching module is adapted to categorize the host instance as a new host on the network.

32. The computer program product of claim 31, wherein the records manager module is adapted to create a host record describing the new host as a persistent host.

33. The computer program product of claim 25, wherein the records manager module is adapted to store vulnerability information in the record, the vulnerability information describing vulnerabilities of the persistent host to network-based attacks.

34. The computer program product of claim 25, wherein the one or more characteristics of a persistent host on the network include application information.

* * * * *